US012347887B2

(12) United States Patent
Kastler et al.

(10) Patent No.: US 12,347,887 B2
(45) Date of Patent: Jul. 1, 2025

(54) APPARATUS HAVING A PLURALITY OF BATTERY CELLS ARRANGED PARALLEL TO ONE ANOTHER WITH RESPECT TO A JOINING AXIS

(71) Applicant: Kreisel Electric GmbH & Co. KG, Rainbach im Mühlkreis (AT)

(72) Inventors: Helmut Kastler, Freistadt (AT); Peter Dobusch, Grünbach (AT); Gerhard Waldschütz, Freistadt (AT)

(73) Assignee: John Deere Electric Powertrain LLC, Moline, IL (US)

( * ) Notice: Subject to any disclaimer, the term of this patent is extended or adjusted under 35 U.S.C. 154(b) by 685 days.

(21) Appl. No.: 17/640,885

(22) PCT Filed: Aug. 10, 2020

(86) PCT No.: PCT/AT2020/060295
§ 371 (c)(1),
(2) Date: Mar. 7, 2022

(87) PCT Pub. No.: WO2021/042141
PCT Pub. Date: Mar. 11, 2021

(65) Prior Publication Data
US 2022/0336909 A1 Oct. 20, 2022

(30) Foreign Application Priority Data

Sep. 5, 2019 (AT) .............................. A 50774/2019

(51) Int. Cl.
*H01M 50/291* (2021.01)
*H01M 50/213* (2021.01)
(Continued)

(52) U.S. Cl.
CPC ....... *H01M 50/291* (2021.01); *H01M 50/213* (2021.01); *H01M 50/50* (2021.01); *H01M 50/503* (2021.01); *H01M 50/522* (2021.01)

(58) Field of Classification Search
CPC ............. H01M 50/204; H01M 50/207; H01M 50/213; H01M 50/244; H01M 50/291; H01M 50/503
See application file for complete search history.

(56) References Cited

U.S. PATENT DOCUMENTS 8,178,234 B2   5/2012   Fukuoka et al.
8,956,747 B2   2/2015   Itoi et al.
(Continued)

FOREIGN PATENT DOCUMENTS

CN   201207399 Y   3/2009
CN   206685445 U   11/2017
(Continued)

OTHER PUBLICATIONS

English-language Abstract for CN 206685445 U, Nov. 28, 2017.
(Continued)

*Primary Examiner* — Amanda C. Walke
(74) *Attorney, Agent, or Firm* — Tiajoloff & Kelly LLP

(57) ABSTRACT

A device has a plurality of battery cells (2) arranged parallel to one another with respect to a joining axis (1) and a contact plate (3) arranged between the battery cells (2) and having a plurality of recesses (4) for circumferentially enclosing the battery cells (2). The battery cells (2) of a battery module can be connected in parallel in groups, irrespective of serial contacting at the cell end sections, and the contact plate (3) has a plurality of contact plate legs (6), which enclose the battery cells (2) with a circumferential section (7) removed
(Continued)

Figure 1:
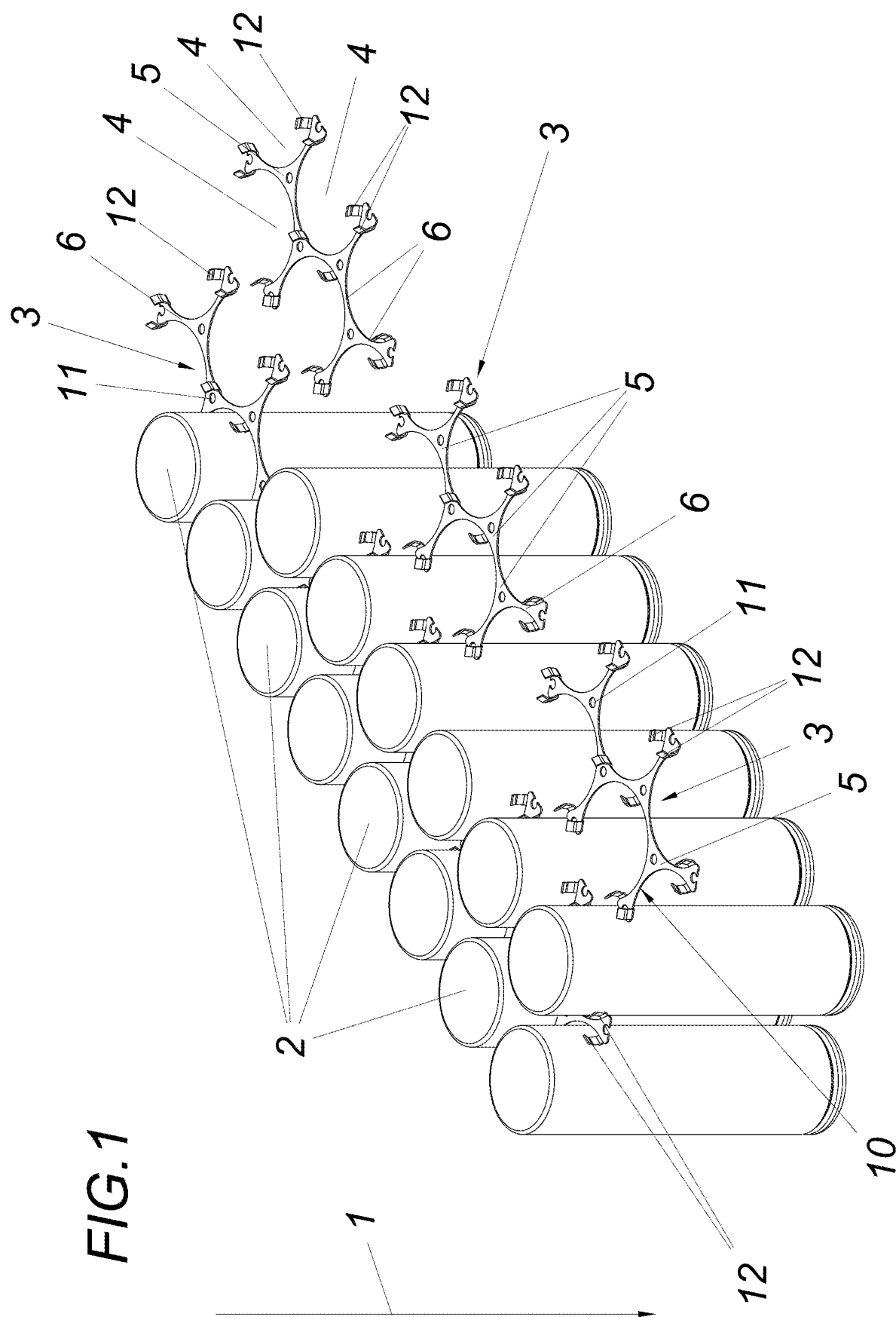

and are connected to one another at intersection points (5), for a respective circumferential section (7) of the battery cells (2).

16 Claims, 2 Drawing Sheets

(51) Int. Cl.
*H01M 50/50* (2021.01)
*H01M 50/503* (2021.01)
*H01M 50/522* (2021.01)

(56) References Cited

U.S. PATENT DOCUMENTS

| | | | |
|---|---|---|---|
| 11,365,130 B2 * | 6/2022 | Imanari | C01G 53/00 |
| 2009/0068555 A1 | 3/2009 | Fukuoka et al. | |
| 2012/0164490 A1 | 6/2012 | Itoi et al. | |
| 2014/0113167 A1 | 4/2014 | Toi et al. | |
| 2015/0140369 A1 | 5/2015 | Itoi et al. | |

FOREIGN PATENT DOCUMENTS

| | | | | |
|---|---|---|---|---|
| CN | 108666466 A | 10/2018 | | |
| DE | 102011000969 A1 | 8/2012 | | |
| DE | 102019211359 A1 * | 6/2020 | ........ | H01M 10/0481 |
| EP | 1883126 A1 | 1/2008 | | |
| EP | 2475028 A1 | 7/2012 | | |
| EP | 3096372 A1 | 11/2016 | | |
| WO | WO-2019208217 A1 * | 10/2019 | .......... | H01M 10/613 |
| WO | WO-2020147869 A1 * | 7/2020 | ........ | H01M 10/0404 |
| WO | WO-2021042142 A1 * | 3/2021 | .......... | H01M 10/643 |

OTHER PUBLICATIONS

English-language Abstract for CN 201207399 Y, Mar. 11, 2009.
English-language Abstract for CN 108666466 A, Oct. 16, 2018.
English-language Abstract for DE 102011000969 A1, Aug. 30, 2012.

* cited by examiner

APPARATUS HAVING A PLURALITY OF BATTERY CELLS ARRANGED PARALLEL TO ONE ANOTHER WITH RESPECT TO A JOINING AXIS

FIELD OF THE INVENTION

The invention relates to a device having a plurality of battery cells arranged parallel to one another with respect to a joining axis and a contact plate arranged between the battery cells and having a plurality of recesses for circumferentially enclosing the battery cells.

DESCRIPTION OF THE PRIOR ART

Prior art devices for electrically connecting several battery cells arranged parallel to their joining axis are known, in which individual battery cells of a battery module are enclosed on the pole side by contact springs under pretension and are connected in parallel by means of a contact plate (EP3096372A1). The contact springs are welded to opposite electrical cell poles of the adjacent battery cells of a neighboring battery module in the joining direction. However, the disadvantage of this is that the materially bonded connection of the individual battery cells impedes the replacement of defective battery cells and can lead to an overdetermined force system in the assembly process, at least with respect to one cell pole, and that fixed voltage potentials are predetermined by the arrangement of the contact plate on both sides of the battery cells of a battery module. In addition, the electrical connection is limited in that positive and negative poles of the battery cells of two battery modules, which are adjacent to each other in the joining direction, are simultaneously connected in series and in parallel via an electrical connection. Furthermore, the need for a parallel plate and a contact spring means that more material is required, which must be avoided in terms of resource-saving production.

SUMMARY OF THE INVENTION

The invention is thus based on the object of further developing a device of the type described at the beginning in such a way that the battery cells of a battery module can be optionally connected in groups in parallel with the least possible material input, namely independently of serial contacting at the cell end sections.

The invention solves the problem in that the contact plate has a plurality of contact plate legs, each for a circumferential section of the battery cells, which enclose the battery cells with a circumferential section removed and are connected to one another at intersection points. The invention is based on the consideration that battery cells can be contacted not only via the poles on the end section side, which are usually led to the outside, but also via a peeled battery cell jacket. As a result of the measures according to the invention, not all battery cells adjacent to the contact plate are connected in parallel with each other, but only those that rest against one of the contact plate legs. In the area of the recessed circumferential sections, battery cells can be adjacent to each other without a parallel connection occurring due to the contact plate. The battery cells of such electrically separated groups can, for example, be connected to each other in series at the poles on the end section side, so that different voltage levels can prevail within a battery module comprising these groups. The recessed circumferential section also results in a reduced material requirement, not only in the battery cell interstices but also in particular in the edge region, which can be left free in an embodiment according to the invention so that the battery cells are not enclosed by an outer ring of contact plate legs.

In order to avoid mechanical overdetermination of the force system of the device according to the invention, it is proposed that the contact plate legs are arranged without loops along a main direction in an open chain from which transverse branches project without loops. Along the main direction, which is preferably the longest extent of contact plate legs arranged in a row, battery cells can thus be connected in parallel in a simple manner, and larger battery cell groups can also be connected together by changing the main direction within a battery module. Loop-free in this context means that no closed ring structures are formed within the interconnected contact plate legs.

Particularly efficient use of material is achieved if each contact plate leg encloses two battery cells opposite each other with respect to the contact plate leg. This has the further advantage that the battery cell leg can be clamped between the battery cells in this way, so that additional fastening means are unnecessary.

In order to increase the torsional stiffness of the contact plate according to the invention and at the same time to be able to adapt it to the specific battery cell cross-section, it is advisable for the contact plate legs to widen to the two end sections of the contact plate legs in order to adapt their longitudinally extending side surfaces to the cross-section of the adjacent battery cells. The end sections form the intersection points between adjoining contact plate legs, so that the widening in this area results in a relatively small amount of additional material. In particular in the case of cylindrical battery cells with a round cross-section, this has the advantage that the space between the battery cells is stiffened when they are arranged in the form of an extremely tight circular pack, which increases the overall mechanical stability of the battery cells joined together.

In order to further reduce the amount of material required and to be able to fix the contact plate to a carrier, for example of a battery module, it is proposed that the contact plate legs each have a through-opening at their two end sections for fixing the contact plate to this carrier. For this purpose, the carrier can comprise, for example, latching extensions which are inserted into the through-openings and engage behind them under pretension. In the case where a contact plate according to the invention is produced in an endless strip, these through-openings have the further advantage that it is easier to cut the strip at the location of the through-openings due to the weakening of the material and, at the same time, predetermined geometries are produced for the contact plate.

For torsion-free introduction of the contact forces required for reliable electrical contacting into the contact plate, contact tongues projecting into the recess can be provided for each recess on at least two end sections of the adjacent contact plate legs, which are offset by at least 120° relative to each other with respect to a circle inscribed in the recess. In this way, the occurring spring forces cancel each other out vectorially to a large extent, while the remaining forces can preferably be absorbed by two contact tongues opposite each other with respect to an end section or by a contact plate metal leg opposite a contact tongue with respect to an end section. In this way, the required material thickness of the contact plate and the need for its support can be kept particularly low.

In the case of cylindrical battery cells with a round cross-section, particularly advantageous contacting conditions result if each battery cell is enclosed by at least two and at most four contact plate legs with one of its circumferential sections recessed.

For connecting six adjacent battery cells, it has proved advantageous in accordance with the invention if the contact plate forms six recesses, wherein two recesses are bounded by two contact plate legs, a further two recesses by three contact plate legs and the remaining two recesses by four contact plate legs. In this context, it is pointed out that in a battery module a plurality of contact plates can be arranged in one plane without electrical connection to one another or a plurality of contact plates can be arranged in different planes, in which case the individual contact plates can be connected to one another via the electrically conductive sheath of a common battery cell.

BRIEF DESCRIPTION OF THE INVENTION

Figure 2:
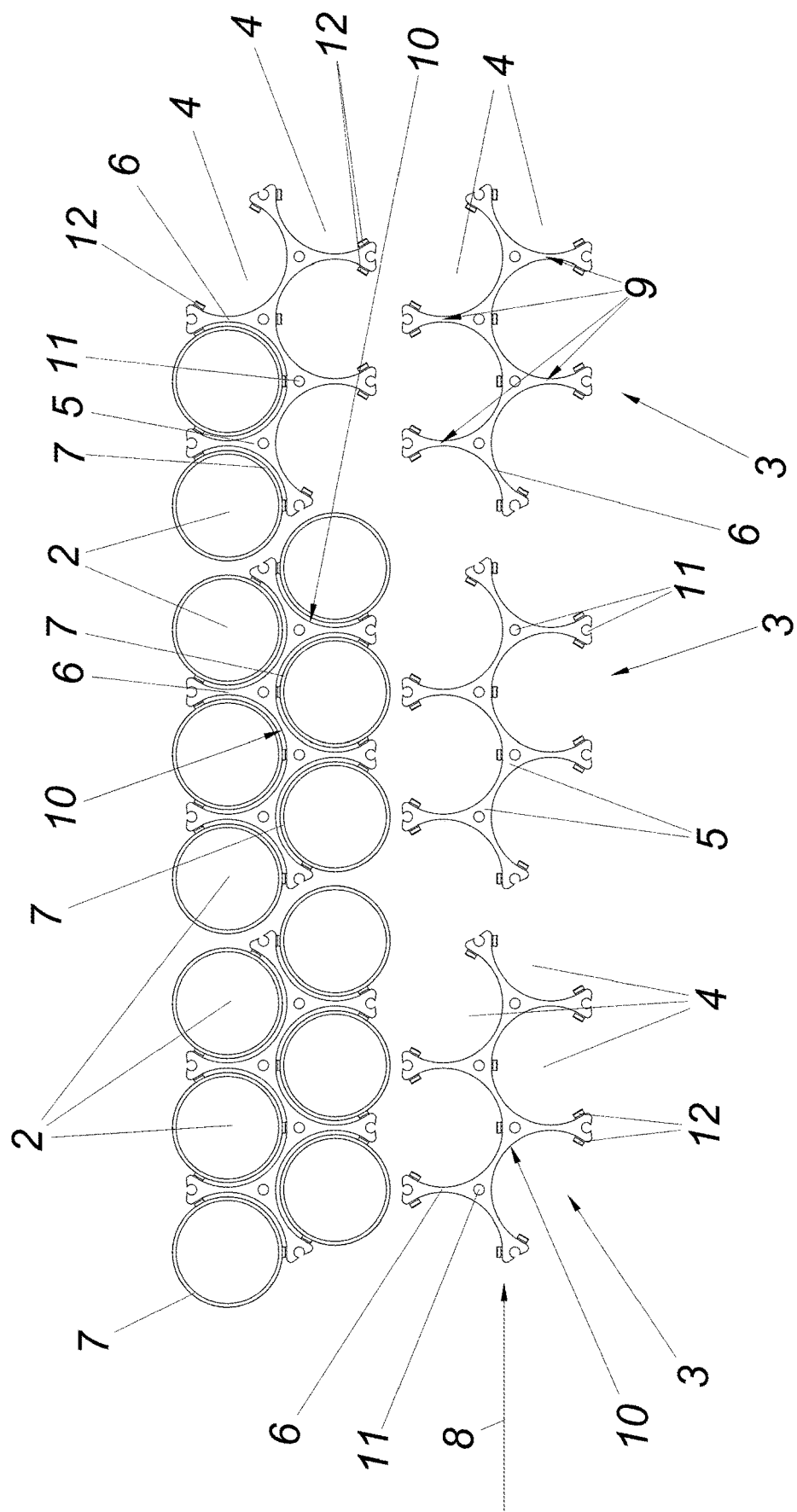

In the drawing, the subject matter of the invention is shown by way of example, wherein:

FIG. 1 shows a perspective view of a device according to the invention with battery cells only partially inserted for illustration purposes, and FIG. 2 shows a top view of this device corresponding to FIG. 1.

DETAILED DESCRIPTION OF THE PREFERRED EMBODIMENTS

As can be seen from FIGS. 1 and 2, a device according to the invention has several battery cells 2 arranged parallel to one another with respect to a joining axis 1, which are in contact with one another via a contact plate 3 arranged between these battery cells 2. The contact plate 3 forms a plurality of recesses 4 for circumferentially enclosing the battery cells 2. For this purpose, as can be seen in particular from FIG. 2, the contact plate 3 consists of a plurality of contact plate legs 6 connected to one another at intersection points 5. These contact plate legs 6 are each assigned to a circumferential section 7 of an adjacent battery cell 2, and enclose the latter by recessing at least one circumferential section 7 of the adjacent battery cell 2.

In the embodiment shown in the drawing, each battery cell 2 is enclosed by at least 2 and at most 4 contact plate legs 6, so that between 4/6 and 2/6 of the circumference of the battery cells remain unenclosed.

In the embodiment shown, three contact plate metal legs 6 meet with their one end sections at each of the intersection points 5. As can be seen in particular from FIG. 2, the contact plate legs 6 are connected to one another via the intersection points 5 in such a way that they form an open chain in the main direction 8, wherein a contact plate leg 6 acts as a transverse branch 9 projecting without loops at each intersection point 5. Loop-free in this context means that at the end of each chain a contact plate leg 6 is connected to other contact plate legs 6 only at one of its end sections.

In order to achieve a tight packing of the battery cells 2 and at the same time to meet the requirements of an efficient use of material, each contact plate leg 6 encloses two battery cells 2 opposite each other with respect to the contact plate leg 6.

To protect against any torsional moments that may occur during operation and to adapt their longitudinally extending side surface 10 to the cross-section of the adjacent battery cells 2, the contact plate legs 6 can widen towards their end sections.

In principle, the device according to the invention can be used in combination with other components in a battery module. To make it easier to join the contact plate 3 to a carrier, the contact plate legs 6 can have through-openings 11 at their two end sections, which serve as receptacles for, for example, latching extensions of the carrier.

For reliable contacting of the battery cells 2, contact tongues 12 projecting into the recess 4 are provided on at least two end sections of the surrounding contact plate legs 6 for each recess 4. The recesses 4 can form different embodiments depending on how many contact plate legs they are bounded by: According to a first embodiment, a recess 4 may be bounded by two contact plate legs 6. In this case, two contact tongues 12 project into the recess 4, which are offset by 120° with respect to each other relating to a circle inscribed in the recess 4. According to a further embodiment, the recesses 4 may be bounded by three contact plate legs 6, wherein the contact tongues 12 projecting into the recess 4 face each other, i.e. being offset by 180° with respect to each other. According to a third embodiment, the recesses 4 may be bounded by four contact plate legs 6. For this embodiment, three contact tongues 12, each offset by 120° from one another, can be provided. It is understood that several different embodiments can be realized in a device according to the invention.

Particularly advantageous assembly conditions result if the contact plate 3 forms six recesses 4, with two recesses 4 of each embodiment described above being provided.

The invention claimed is:

1. A device comprising:
a plurality of battery cells arranged parallel to one another with respect to a joining axis; and
a contact plate arranged between the battery cells and having a plurality of recesses, each of said recesses enclosing a respective one of the battery cells on a circumferential side thereof so that the contact plate electrically connects the circumferential sides of the battery cells in the recesses thereof;
wherein the contact plate has a plurality of contact plate legs each associated with a respective circumferential section of the battery cells, wherein said contact plate legs enclose the battery cells except in a respective portion of a circumference of the battery cell, and
said contact plate legs are connected to one another at intersection points.

2. The device according to claim 1, wherein the contact plate legs are arranged without loops along a main direction in an open chain from which transverse branches project without loops.

3. The device according to claim 1, wherein each contact plate leg encloses a respective two of said battery cells opposite each other with respect to the contact plate leg.

4. The device according to claim 1, wherein the contact plate legs widen to two end sections of the contact plate legs so as to match longitudinally extending side surfaces thereof to a cross-section of the battery cells adjacent thereto.

5. The device according to claim 1, wherein the contact plate legs each have a through-opening at end sections thereof fixing the contact plate on a carrier.

6. The device according to claim 1, wherein contact tongues project into each recess on at least two end sections of adjacent contact plate legs, and said contact tongues are offset by at least 120° with respect to each other in relation to a circle inscribed in the associated recess.

7. The device according to claim 1, wherein each of said battery cells is enclosed by at least two and at most four contact plate legs with a gap in a circumferential section thereof.

8. The device according to claim 1, wherein the contact plate forms six recesses, wherein two of said recesses are bounded by two of said contact plate legs, a further two of said recesses are bounded by three of said contact plate legs, and the remaining two of said recesses are bounded by four contact plate legs.

9. The device according to claim 1, wherein the contact plate defines six of said recesses, wherein two of said recesses are bounded by two of said contact plate legs, another two of said recesses are bounded by three of said contact plate legs, and another two of said recesses are bounded by four contact plate legs.

10. A device comprising:
   a plurality of battery cells arranged parallel to one another; and
   a contact plate arranged between the battery cells, said contact plate having a plurality of contact plate legs connected to one another at intersection points, and each contact plate leg being associated with a respective circumferential section of an associated one of the battery cells;
   the contact plate legs defining a plurality of recesses in said contact plate, each of the recesses enclosingly receiving a respective one the battery cells so that the contact plate extends around a part of a circumference of the associated battery cell and has an electrical contact therewith, with another part of the circumference of the associated battery cell being outside the recess.

11. The device according to claim 10, wherein the contact plate legs are configured as an open chain extending in a main direction, said open chain having transverse branches projecting therefrom without loops.

12. The device according to claim 11, wherein the contact plate legs widen to two end sections of the contact plate legs so as to conform the side surfaces thereof to a cross-section of the two of the battery cells enclosed thereby.

13. The device according to claim 11, wherein the contact plate legs each have a respective through-opening in one of end sections thereof fixing the contact plate on a carrier.

14. The device according to claim 10, wherein each contact plate leg encloses a respective two of said battery cells on opposite side surfaces of the contact plate leg.

15. The device according to claim 10, wherein each of said battery cells is enclosed by at least two and at most four contact plate legs, with a circumferential part of the battery cell not enclosed thereby.

16. A device comprising:
   a plurality of battery cells arranged parallel to one another; and
   a contact plate arranged between the battery cells, said contact plate having a plurality of contact plate legs connected to one another at intersection points, and each contact plate leg being associated with a respective circumferential section of an associated one of the battery cells;
   the contact plate legs defining a plurality of recesses in said contact plate, each of the recesses enclosingly receiving a respective one the battery cells so that the contact plate extends around a part of a circumference of the associated battery cell, with another part of the circumference of the associated battery cell being outside the recess; and
   wherein the contact plate legs have contact tongues projecting into each recess, and said contact tongues are offset by at least 120° with respect to each other in relation to a circle inscribed in the associated recess.

* * * * *